United States Patent [19]
Blasko et al.

[11] 4,318,743
[45] Mar. 9, 1982

[54] CURABLE PIGMENTED SILICATE COMPOSITIONS

[75] Inventors: John E. Blasko; William G. Boberski, both of Gibsonia; Jerome A. Seiner, Pittsburgh, all of Pa.

[73] Assignee: PPG Industries, Inc., Pittsburgh, Pa.

[21] Appl. No.: 210,497

[22] Filed: Nov. 26, 1980

Related U.S. Application Data

[63] Continuation of Ser. No. 73,977, Sep. 10, 1979, abandoned.

[51] Int. Cl.$^3$ ............................................. C04B 19/04
[52] U.S. Cl. ...................................................... 106/84
[58] Field of Search ................................. 106/74, 84

[56] References Cited

U.S. PATENT DOCUMENTS

| | | | |
|---|---|---|---|
| 3,416,939 | 12/1968 | Schutt et al. | 106/84 |
| 3,715,224 | 2/1973 | Campbell | 106/84 |
| 4,137,087 | 1/1979 | Blasko et al. | 106/74 |
| 4,169,735 | 10/1979 | Boberski et al. | 106/74 |

*Primary Examiner*—James Poer
*Attorney, Agent, or Firm*—Thomas M. Breininger; Charles R. Wilson; Godfried R. Akorli

[57] ABSTRACT

This invention relates to pigmented curable silicate compositions having better pigment dispersions as evidenced by improved color uniformity, hiding power, lower viscosity and consistency. The aqueous compositions contain water-soluble or -dispersible silicate glass, pigment and a base having a basicity greater than that of the silicate glass. Preferred compositions also contain a water-soluble latent insolubilizing agent.

26 Claims, No Drawings

CURABLE PIGMENTED SILICATE COMPOSITIONS

This is a continuation of application Ser. No. 73,977, filed Sept. 10, 1979, now abandoned.

BACKGROUND OF THE INVENTION

During the past several years, environmental pollution concerns have led those active in the coatings, castings and moldings arts to develop various curable compositions in which organic solvents derived from petroleum have been eliminated or at least substantially minimized. Thus, compositions such as water-based compositions and high solids compositions have been extensively investigated. Even more recently the high cost and scarcity of petroleum by-products has engendered interest in the development of curable compositions which are composed entirely of, or at least substantially of, inorganic components.

Inorganic coating compositions based on alkali metal silicates are well known in the art. Such compositions can be applied from an aqueous medium alone or in combination with various known insolubilizing agents. The insolubilizing agents aid in the fast formation of a water-resistant silicate coating. The coatings are inorganic in nature with the consequent advantages discussed above and possess a desired set of properties.

Unfortunately, pigmented coatings based on the alkali metal silicate can have a less than desired appearance due to an inadequate pigment dispersion in the coating composition. This inadequate pigment dispersion is most noticeable in lapped areas, where fresh additional coating composition is applied over a first coat of the same composition.

The present invention relates to pigmented inorganic coating compositions based on water-soluble or water-dispersible silicates which are capable of providing coatings having good color uniformity.

As used herein, all percents and ratios are by weight unless otherwise indicated.

SUMMARY OF THE INVENTION

Curable aqueous compositions consist essentially of inorganic constituents. More particularly, the curable compositions consist essentially of aqueous solutions or dispersions of silicate glass, pigments and a base having a basicity greater than that of the silicate glass. In one embodiment of the invention, the base is initially ground with the pigment and the resultant grind then combined with the silicate glass. This technique of mixing minimizes shock. In a preferred embodiment, the compositions additionally consist essentially of a water-soluble metal ion containing latent insolubilizing agent. It has been found that the base-containing compositions of the invention have a pigment dispersion superior to similar compositions not containing the base.

DESCRIPTION OF THE INVENTION

This invention is concerned with the discovery that the presence of certain bases either preadsorbed on a pigment's surface or separately added to compositions containing the pigment and an alkali metal silicate glass, improve the appearance of cured films formed from the compositions. In a preferred embodiment the compositions also contain metal ion containing latent insolubilizing agents. The compositions consist essentially of an aqueous phase and pigment. Each of the components of the compositions and the compositions' method of production are described in the paragraphs which follow.

Water-soluble or water-dispersible silicates which are employed in the compositions are the alkai metal silicates, e.g., sodium silicate, potassium silicate, lithium silicate, and mixtures thereof. Preferred water-soluble silicate glasses are sodium and potassium silicate with $SiO_2:M_2O$ mole ratios of about 2:1 to about 4:1, with M representing alkali metal. The level of silicate glass in the aqueous phase of the compositions ranges from about 2 percent to about 50 percent, preferably about 10 percent to about 40 percent. (While silicates commercially available are usually aqueous solutions of silicate, the aforementioned percents are given on a silicate solids basis).

The compositions of the invention also consist essentially of at least one pigment. Preferred pigments are characterized by their ability to adsorb a base from an aqueous solution thereof. Many pigments displaying this characteristic are useful in the compositions of this invention. While the term "adsorb" is employed, it is employed in the sense of removal from solution and is not intended to imply a physical rather than chemical interaction between pigment surface and the base. In fact, the precise mode of interaction is not known. It is believed that any pigment having metal ions on its surface capable of interacting with the base can be enhanced by this invention. This includes most commonly employed pigments.

While the invention enhances the color uniformity properties of any pigment, particularly useful pigments include titanium dioxide, barium metaborate, alumina, zinc oxide, clay and mica. The invention is particularly useful where the compositions contain one or more organic or inorganic coloring pigments which impart a color (other than white), particularly a pastel, bright or intense color. Useful coloring pigments include iron oxide red, barium yellow, zinc yellow, zinc green, cadmium yellow, chrome oxide green, cobalt blue, green or violet, various mixed metal oxides and organic pigments of the azo series. Base-treated pigments are also useful and can, in part or in full, provide the source of the base discussed below. The pigments are employed as dispersed pulverulent solids. Mixtures of pigments can and generally are employed. The pigments are present in an amount of about 5 percent to about 90 percent and preferably about 30 percent to about 70 percent based on the total volume of solids in the composition, i.e., % PVC.

Another essential component of the compositions of the invention is a base having a basicity greater than that of the silicate glass. Such bases include the alkali metal and quaternary ammonium hydroxides, e.g., potassium hydroxide, sodium hydroxide and tetraethyl ammonium hydroxide; alkali metal silicates having a $SiO_2:M_2O$ mole ratio of from about 1:2 to about 2:1 where M is alkali metal, e.g., sodium orthosilicate; organo silanolates, e.g., tripotassium$\gamma$-aminopropylsilantriolate, tripotassium N-($\beta$-aminoethyl)-$\gamma$-aminopropyl-silantriolate, dipotassium$\gamma$-aminopropylmethylsilantriolate, potassium $\gamma$-aminobutyldimethylsilantriolate, tripotassium methyl-silantriolate, dipotassium dimethylsilandiolate and potassium trimethylsilanolate; and mixtures thereof.

The base employed has a basicity greater than that of the silicate glass as measured by their respective pH's at the same normality. This results in the compositions having a better dispersion as evidenced by better color uniformity, hiding power, lower viscosity and consistency, and being substantially lump-free. The level of base in the aqueous phase of the compositions ranges from about 0.01 percent to about 5 percent. A preferred range of base for dilute applications such as found in electrode deposition coating is from about 0.01 percent to about 4 percent. A preferred range of base in the compositions for other coating applications ranges from about 0.1 percent to about 4 percent. An increase in pH in the vicinity of the surface of the pigment is theorized as being responsible for the compositions' better pigment dispersions. This increase in pH is believed to be due to the base having a greater affinity for the pigment's surface than the silicate glass.

Bases above described can be added directly as a component of the curable compositions during or after their formulation. Alternatively, the base can be admixed with at least a portion of the pigment to be employed in the composition. This latter method of incorporating the base into the compositions is preferred; it has been found the resultant compositions are even more substantially lump-free due to less shock when the pigment/base and silicate are combined to form the coating compositions.

The compositions are water based. While the amount of water can vary widely depending on intended use, generally the aqueous phase of the compositions consists essentially of between about 50 percent and about 98 percent water, preferably between about 60 percent and about 90 percent.

A preferred embodiment of the invention are the above described compositions additionally consisting essentially of a water-soluble latent insolubilizing agent. Such agents improve the water-resistance of the silicate coatings and are for this reason desired. Satisfactory insolubilizing agents are described in the following paragraphs.

Metallate insolubilizing agents are described in U.S. Pat. No. 4,140,535, issued Feb. 20, 1979 and copending application Ser. No. 868,567, filed Jan. 10, 1978, which are hereby incorporated by reference in their entireties. The described systems comprise a blend of silicates and water-soluble metallate latent insolubilizing agents where the water-soluble latent insolubilizing agent is selected from alkali metal or quaternary ammonium zincates and borates. Still another water-soluble latent insolubilizing agent is an alkali metal or quaternary ammonium aluminate. Illustrative of such metallate latent insolubilizing agents which can be employed are lithium zincate, potassium zincate, and sodium zincate; lithium borate, potassium metaborate, and sodium tetraborate; and lithium aluminate, potassium aluminate, and sodium aluminate. The term "borate" as used in connection with the alkali metal borates is intended to include orthoborates, pyroborates, metaborates and more complex borate ions. The alkali metal aluminates, especially sodium aluminate, are preferred insolubilizing agents.

U.S. Pat. No. 3,715,224, to Campbell, which is hereby incorporated by reference in its entirety, discloses solutions and/or colloidal suspensions of water-soluble silicates containing monovalent and divalent metal ion complexes. The disclosed metal ion complexes are useful latent insolubilizing agents here also.

Yet other insolubilizing agents are described in U.S. Pat. No. 4,137,087, issued Jan. 30, 1979 which is incorporated by reference in its entirety. Water-soluble latent insolubilizing agents are formed from metal ions selected from the group consisting of $Al^{+++}$, $Fe^{+++}$, $Cr^{+++}$ and $Sn^{++}$ and ligands (i.e., complexing agents) selected from the group consisting of ethylenediaminetetraacetate, diethylenetriaminepentaacetate, N-(hydroxyethyl)ethylenediaminetetraacetate, nitrilotriacetate and 1,3-propanediaminetetraacetate. It should be noted that other similar or analogous type ligands where they exist may be employed and these are considered to be within the scope of the invention. Illustrative examples of such latent insolubilizing agents are compounds such as sodium ethylenediaminetetraacetatoaluminate (III), sodium ethylenediaminetetraacetatoferrate (III), sodium ethylenediaminetetraacetatochromate (III), and sodium ethylenediaminetetraacetatostannate (II).

The amount of latent insolubilizing agent included in the compositions can vary considerably depending upon desired properties. However, in general, the amount of latent insolubilizing agent employed is an amount sufficient to enhance wet abrasion and water resistance of the cured composition but which is insufficient to cause an irreversible gel when the uncured composition is stored for 24 hours at 70° C. In most instances, amounts of metallate latent insolubilizing agent ranging from about 0.1 percent to about 6 percent, preferably from about 0.25 percent to about 2.5 percent by weight, based upon the combined weight of the silicate glass and metallate latent insolubilizing agent are employed. Insolubilizing agents based on the metal ions and ligands are present at a level of from about 0.2 percent to about 12 percent, preferably from about 1 percent to about 5 percent, again based on the combined weight of silicate glass and insolubilizing agent.

The reaction between the silicate glass and latent insolubilizing agent is not known with certitude; however, it is theorized the metallic ion associates with the ligand and the resulting complex maintains the composition in a reasonably stable configuration. However, upon drying (e.g., air drying or baking) the equilibria shift and the metal ion or the metallic ion is released to crosslink the silicate glass and form an insoluble silicate composition having excellent properties. Examples of the properties obtained are stain resistance, flame and heat resistance and water resistance.

The pigmented curable compositions of the invention can contain certain other additives such as, for example, dyes, fillers, antioxidants, flow control agents, and surfactants.

In addition it is often advantageous to include in the compositions a thickener. Of particular value are water-soluble thickeners which are solubilized through carboxyl groups. Illustrative of such materials are sodium polyacrylate, potassium polymethacrylate, sodium salts of styrene maleic anhydride copolymers, sodium carboxymethyl cellulose, and potassium polyacrylate copolymers. Also suitable are inorganic thickeners such as clays and the like.

As mentioned above, the curable compositions of the invention can be employed in various applications. The compositions are particularly useful in coatings over a variety of substrates such as wood, metals, glass, wallboard and the like.

The curable compositions can be applied by any conventional method, including brushing, dipping, rolling, flow coating, roll coating, spraying and the like. Conventional spray techniques and equipment can be utilized.

The curable compositions of the invention can be cured by baking at moderate or elevated temperatures if desired. However, one advantageous property of these curable compositions is that they can be cured by drying in air at ambient temperature without the use of heat. As will be evident, ambient temperature curable compositions are of considerable advantage in that they provide for significant energy savings in comparison to compositions which require elevated temperatures for curing.

The examples which follow are illustrative of the invention with composition B of Example III representing a preferred embodiment.

EXAMPLE I

A coating composition is formulated in the following manner. Twenty-five (25.0) grams of a potassium hydroxide solution (40% solids) and 56.4 grams water are mixed together. The resultant solution is mixed with 62.0 grams of titanium dioxide pigment (Titanox 2060, available from Titanium International Corp.), 8.0 grams of pigment (Shepherd Green #5, available from Shepherd Chem. Co.) and 33.0 grams of pigment (barium metaborate, available from Buckman Laboratories as Busan 11Ml). Coors beads are added to the mixture, followed by a 15 minute grind.

The beads are removed to give a pigment grind having a medium viscosity and little pigment flocculation as evidenced by the presence of only slight "puff" and "hang-up". Puff is defined as being false body, or a high amount of viscosity at low shear rates, that results from pigment flocculation. Hang-up results from the puff. Hang-up is evidenced by paint clinging to the side of a container while paint in the center is being mixed or sheared by the action of the mixer blade. Puff and hang-up are both undesirable.

Next, 350.0 grams of potassium silicate (mole ratio of $SiO_2:K_2O = 3.9$, 29.1% solids) is added to the pigment grind, followed by 76.0 grams of mica (Micromica C1000, available from English Mica Corp.), 10.0 grams of clay (Attagel 40, available from Minerals and Chemicals Phillipp Corp.), 4.0 grams of sodium carboxymethyl cellulose (available from Hercules Chemical Co. as 12M8 grade) and 3.0 grams of polyethylene oxide (Polyox WSR-205, available from Union Carbide Corp.). This mixture is mixed for 15 minutes. The final composition is as follows:

|  | Percent |
|---|---|
| Potassium silicate (solids) | 23.23 |
| Water | 72.89 |
| Potassium hydroxide (solids) | 2.28 |
| Sodium carboxymethyl cellulose | 0.92 |
| Polyethylene oxide | 0.68 |
|  | 100.00 |
| Pigment (53% PVC) |  |
| Titanium dioxide | 32.81 |
| Shepherd Green #5 | 4.23 |
| Barium metaborate | 17.46 |
| Mica | 40.21 |
| Clay | 5.29 |
|  | 100.00 |

The composition has a smooth consistency and no puff or hang-up.

The compositions are next coated onto a prepainted plasterboard substrate and evaluated for pigment dispersibility. This is done by first applying a base coat (application made all in one direction), allowing it to dry and then applying a second coat (application made in horizontal and vertical directions to the base coat). A visual evaluation of the coated substrate indicates the coating compositions have good color uniformity and good lapping characteristics.

EXAMPLE II

Coating compositions are formulated to show the effect potassium hydroxide has in compositions containing potassium silicate and aluminum ethylenediamine tetraacetate complex. The compositions contain the following components:

|  | Compositions (%) | | |
|---|---|---|---|
| Component | A | B | C |
| Potassium silicate (mole ratio of $SiO_2:K_2O = 3.3$, solids) | 20.86 | 20.86 | 20.86 |
| Water | 75.29 | 74.72 | 74.14 |
| Aluminum ethylenediamine tetraacetate complex (solids) | 1.80 | 1.80 | 1.80 |
| Potassium hydroxide (solids) | — | 0.57 | 1.15 |
| Defoamer (1) | 0.52 | 0.52 | 0.52 |
| Sodium carboxymethyl cellulose (2) | 1.39 | 1.39 | 1.39 |
| Surfactant (3) | 0.14 | 0.14 | 0.14 |
|  | 100.00 | 100.00 | 100.00 |
| Pigment (% PVC) | 55% | 54% | 53% |
| Titanium dioxide (4) | 56.00 | 56.00 | 56.00 |
| Clay (4) | 5.33 | 5.33 | 5.33 |
| Mica (325 mesh) | 38.67 | 38.67 | 38.67 |
|  | 100.00 | 100.00 | 100.00 |

(1) Available from Nopco Div. of Diamond Shamrock Co. as Foamaster G.
(2) Available from Hercules Chemical Co. as 7M8S grade.
(3) Available from Dexter Chemical Co. as Strodex PK-90.
(4) Same as used in Example I.

Composition A has noticeable puff, hang-up and the appearance of a gelatinous structure. Composition B has no puff and a slight, but acceptable, hang-up, while Composition C has no puff and very slight hang-up.

Brush application of the compositions to a plasterboard substrate shows Composition A to exhibit a medium drag during the application. The gelatinous structure of the composition (this being an indication of puff) broke down on repeated brushings. Compositions B and C exhibit only low-medium drag during brush application and the respective paint films show no indication of an objectionable gelatinous structure.

EXAMPLE III

This example illustrates the use of sodium hydroxide and potassium hydroxide as base materials in the compositions of the invention. The compositions are made following the procedure of Example I:

|  | Percent | |
|---|---|---|
|  | A | B |
| Potassium silicate (mole ratio of $SiO_2:K_2O = 3.9$, solids) | 23.30 | 23.30 |
| Water | 74.05 | 73.68 |
| Sodium aluminate | 0.13 | 0.13 |
| Sodium hydroxide (solids) | 0.91 | — |
| Potassium hydroxide (solids) | — | 1.28 |
| Sodium carboxymethyl cellulose (1) | 0.92 | 0.92 |
| Polyethylene oxide (1) | 0.69 | 0.69 |
|  | 100.00 | 100.00 |
| Pigment (54% PVC for Compositions A and B) |  |  |
| Titanium dioxide (1) | 32.80 |  |
| Shepherd Green #5 (1) | 4.23 |  |
| Barium metaborate (1) | 17.46 |  |
| Mica (1) | 40.21 |  |

-continued

|  | Percent | |
|---|---|---|
|  | A | B |
| Clay (1) | 5.29 | |
|  | 100.00 | |

(1) As used in Example I.

Composition A is made by first blending 14.6 grams sodium hydroxide solution (27.3% solids), 0.57 grams sodium aluminate and 60.0 grams water. This blend has added to it 49.0 grams water, 62.0 grams titanium dioxide, 8.0 grams Shepherd Green #5 pigment and 33.0 grams barium metaborate and is then ground together with Coors beads for 15 minutes. A portion (150.0 grams) of the potassium silicate is next added. After removing the Coors beads, a blend of 76.0 grams of mica, 10.0 grams clay, 4.0 grams sodium carboxymethyl cellulose and 3.0 grams of the surfactant is added. The mixture has next added to it the balance of the potassium silicate (200.0 grams) to get the final coating composition. The composition has only slight puff and no hang-up.

Composition B is made in a similar manner with the substitution of potassium hydroxide for the sodium hydroxide.

The compositions when painted on a substrate in the manner of Example I and visually tested for color uniformity and lapping proved to be satisfactory. Composition B does have better cure than Composition A as evidenced by B's film having better water-resistance and durability.

EXAMPLE IV

This example illustrates the advantages of the invention when sodium methylsiliconate is used as the base material. Two compositions, one being a control, are formulated as follows:

| Components | Compositions (%) | |
|---|---|---|
|  | A | B |
| Potassium silicate (mole ratio of SiO$_2$:K$_2$O = 3.9, solids) | 23.23 | 23.23 |
| Water | 74.26 | 71.98 |
| Sodium aluminate | 0.13 | 0.13 |
| Potassium hydroxide (solids) | 0.11 | 0.11 |
| Sodium methylsiliconate (2) | — | 2.28 |
| Glycerine | 1.14 | 1.14 |
| Defoamer (1) | 0.34 | 0.34 |
| Sodium carboxymethyl cellulose (5) | 0.68 | 0.68 |
| Thickener (3) | 0.11 | 0.11 |
|  | 100.00 | 100.00 |
| Pigment (% PVC) | 52% | 52% |
| Titanium dioxide (5) | 34.85 | 34.85 |
| Inorganic pigment (4) | 3.88 | 3.88 |
| Barium metaborate (5) | 18.55 | 18.55 |
| Mica (5) | 42.72 | 42.72 |
|  | 100.00 | 100.00 |

(1) Available from SWS Silicones, Inc. as SWS-214.
(2) Available from Dow Corning Corp. as Dow Corning 772.
(3) Available from B. F. Goodrich Chemical Co. as Carbopol 910.
(4) Available from Ferro Chemical Co. as Ferro V3285.
(5) Same as used in Example I The compositions are made by making a solution of 0.57 grams sodium aluminate, 0.5 grams potassium hydroxide and 50.0 grams water and blending with additional water (27.3 grams for Composition A and 19.0 grams for Composition B), 5.0 grams glycerine, and 1.5 grams defoamer. Ten (10.0) grams sodium methylsiliconate is added to Composition B. The remaining components are added in the following order: 62.0 grams titanium dioxide, 6.9 grams inorganic pigment, 33.0 grams barium metaborate, 3.0 grams CMC, blended for 10 minutes, 350 grams potassium silicate added under agitation, 76.0 grams mica and 0.5 grams thickener and then the total composition blended for 10 minutes.

At the end of the blending, Composition A exhibited a moderate puff and no hang-up while Composition B exhibited a trace of puff and no hang-up.

Plasterboard substrates, as in Example I, are next painted with each of the compositions. The color uniformity of the film formed by Composition A is very good while that painted with Composition B is excellent. Composition A's film has a moderate density of small lumps of flocculated pigment while Composition B's film has none.

EXAMPLE V

Sodium orthosilicate is used in varying levels in this example to show the effect it has on the coating compositions and films formed therefrom. The compositions are as follows:

| Component | Compositions (%) | | | | | |
|---|---|---|---|---|---|---|
|  | A | B | C | D | E | F |
| Potassium silicate (mole ratio of SiO$_2$:K$_2$O = 3.9, solids) | 23.47 | 23.47 | 23.47 | 23.47 | 23.47 | 23.47 |
| Water | 73.01 | 72.78 | 72.55 | 72.09 | 71.19 | 69.40 |
| Sodium aluminate | 0.13 | 0.13 | 0.13 | 0.13 | 0.13 | 0.13 |
| Potassium hydroxide (solids) | 0.12 | 0.12 | 0.12 | 0.12 | 0.12 | 0.12 |
| Sodium orthosilicate pentahydrate | — | 0.23 | 0.46 | 0.92 | 1.82 | 3.61 |
| Citric acid | 0.09 | 0.09 | 0.09 | 0.09 | 0.09 | 0.09 |
| Aminopropyl propanol | 0.23 | 0.23 | 0.23 | 0.23 | 0.23 | 0.23 |
| Surfactant (1) | 0.97 | 0.97 | 0.97 | 0.97 | 0.97 | 0.97 |
| Surfactant (2) | 0.14 | 0.14 | 0.14 | 0.14 | 0.14 | 0.14 |
| Defoamer (3) | 0.23 | 0.23 | 0.23 | 0.23 | 0.23 | 0.23 |
| Polyethylene oxide (4) | 0.69 | 0.69 | 0.69 | 0.69 | 0.69 | 0.69 |
| Sodium carboxymethyl cellulose (4) | 0.92 | 0.92 | 0.92 | 0.92 | 0.92 | 0.92 |
|  | 100.00 | 100.00 | 100.00 | 100.00 | 100.00 | 100.00 |
|  | 52% | 52% | 52% | 52% | 51% | 50% |
| Pigment (% PVC) | | | | | | |
| Titanium dioxide (4) | 32.80 | 32.80 | 32.80 | 32.80 | 32.80 | 32.80 |
| Shepherd Green #5 (4) | 4.23 | 4.23 | 4.23 | 4.23 | 4.23 | 4.23 |
| Barium metaborate (4) | 17.46 | 17.46 | 17.46 | 17.46 | 17.46 | 17.46 |

-continued

| | | | | | | |
|---|---|---|---|---|---|---|
| Mica (4) | 40.21 | 40.21 | 40.21 | 40.21 | 40.21 | 40.21 |
| Clay (4) | 5.29 | 5.29 | 5.29 | 5.29 | 5.29 | 5.29 |
| | 100.00 | 100.00 | 100.00 | 100.00 | 100.00 | 100.00 |

(1) Nonionic surfactant available from BASF-Wyandotte Co. as Tetronic 304.
(2) Nonionic surfactant available from Rohm & Haas Co. as Triton X45.
(3) Available from SWS Silicones, Inc. as SWS-214.
(4) Same as used in Example I.

The viscosities of the compositions are measured with a Stormer Viscometer and are graded for color uniformity using a scale of 0-100 with 0 being the poorest and 100 being the best. The gelatinous structure is visually estimated as noted.

| Composition | Viscosity (Krebs units) | Color Uniformity Rating | Gelatinous Structure |
|---|---|---|---|
| A | 106 | 27 | slight-moderate |
| B | 105 | 42 | " |
| C | 102 | 33 | slight |
| D | 97 | 38 | " |
| E | 83 | 67 | none |
| F | 82 | 98 | " |

The above tests indicate increasing the level of sodium orthosilicate decreases the viscosity, improves color uniformity and reduces the formation of an objectionable gelatinous structure in the compositions.

EXAMPLE VI

This example shows the advantage of mixing pigment and base together prior to combining with silicate binder. Two compositions are formulated. Each has the following composition:

| | Percent |
|---|---|
| Potassium silicate (molar ratio of SiO$_2$:K$_2$O = 3.9, solids) | 23.79 |
| Water | 70.16 |
| Sodium aluminate | 0.13 |
| Potassium hydroxide (solids) | 0.12 |
| Sodium methylsiliconate (1) | 2.90 |
| Glycerine | 1.17 |
| Defoamer (1) | 0.35 |
| Aminomethyl propanol | 0.28 |
| Citric acid | 0.12 |
| Nonionic surfactant (2) | 0.16 |
| Sodium carboxymethyl cellulose | 0.70 |
| Thickener (1) | 0.12 |
| | 100.00 |
| Pigment (55% PVC) | |
| Titanium dioxide (1) | 39.75 |
| Shepherd #125 Blue (3) | 4.42 |
| Barium metaborate (1) | 14.74 |
| Mica (1) | 41.09 |
| | 100.00 |

(1) Same as used in Example IV.
(2) Available from Rohm & Haas Co. as Triton X45.
(3) Available from Shepherd Chemical Co.

One composition is made by blending the (a) sodium methylsiliconate with the water, sodium aluminate, potassium hydroxide, glycerine, defoamer, aminomethyl propanol, citric acid and nonionic surfactant with (b) pigments and then combining the blend with the remaining components. No hang-up or puff is observed at any stage of the formulation making; the composition has a smooth consistency at all stages.

A second composition is made identical to the first with the exception being the post addition of the sodium methylsiliconate to a blend of all the other remaining components, followed by agitation. The final composition has a smooth non-gelatinous consistency, free of puff and hang-up; however, heavy puff and hang-up are noticed in the composition prior to the addition of the siliconate. This illustrates the advantage of adding the base to the pigment prior to combining with silicate.

The above examples illustrate the advantages obtained from the present invention. The examples all show that the inclusion of a base in a silicate-containing composition improves the appearances of resultant coatings.

What is claimed is:

1. A curable coating composition having improved pigment dispersion, consisting essentially of:
   (a) an aqueous phase of
      (i) from about 2 percent to about 50 percent of a water-soluble alkali metal silicate glass having a SiO$_2$:M$_2$O mole ratio of about 2:1 to about 4:1 wherein M represents the alkali metal;
      (ii) from about 0.01 percent to about 5 percent of a watersoluble base having a basicity greater than that of the silicate glass; and
      (iii) from about 50 percent to about 98 percent of water;
   (b) pigment, wherein the pigment represents from about 5 percent to about 90 percent by volume of the solids in the composition; and
   (c) a water-soluble latent insolubilizing agent for the silicate.

2. The composition of claim 1 wherein the level of the base ranges from about 0.01 percent to about 4 percent.

3. The composition of claim 1 wherein the base is present at a level ranging from about 0.1 percent to about 4 percent.

4. The composition of claim 3 wherein the base is an alkali metal or quaternary ammonium hydroxide, an alkali metal silicate having an SiO$_2$:M$_2$O mole ratio of from about 1:2 to about 2:1 where M is alkali metal, an organosilanolate, or mixture thereof.

5. The composition of claim 4 wherein the base is sodium or potassium hydroxide.

6. The composition of claim 1 wherein the water-soluble latent insolubilizing agent for the silicate is in an amount sufficient to enhance the wet-abrasion resistance of a cured coating, but insufficient to cause an irreversible gel when the composition is aged for 24 hours at 70° C.

7. The composition of claim 6, wherein the latent insolubilizing agent is formed from $Al^{+++}$, $Fe^{+++}$, $Cr^{+++}$ or $Sn^{++}$ ions and ligands selected from the group consisting of ethylenediaminetetraacetate, diethylenetriaminepentaacetate, N-(hydroxyethyl)-ethylenediaminetriacetate, nitrilotriacetate and 1,3-propanediaminetetraacetate and is present at a level ranging from about 0.2 percent to about 12 percent based on the combined weight of the silicate glass and insolubilizing agent.

8. The composition of claim 1 wherein the aqueous phase consists essentially of (i) from about 10 percent to about 40 percent of the silicate glass, (ii) from about 0.1 percent to about 4 percent of the base and (iii) from about 60 percent to about 90 percent of the water.

9. The composition of claim 8 wherein the pigment represents from about 30 percent to about 70 percent by volume of the solids in the composition.

10. A method of preparing a curable coating composition having improved pigment dispersion comprising: combining
   (a) from about 2 percent to about 50 percent of a water-soluble alkali metal silicate glass having a $SiO_2:M_2O$ mole ratio of about 2:1 to about 4:1 wherein M represents the alkali metal;
   (b) from about 0.01 percent to about 5 percent of a water-soluble base having a basicity greater than that of the silicate glass;
   (c) from about 50 percent to about 98 percent water; and
   (d) pigment in an amount of from about 5 percent to about 90 percent by volume of the solids in the composition;
wherein the pigment and base are mixed prior to combining with the silicate glass and water.

11. A method of preparing a curable coating composition having improved pigment dispersion comprising: combining
   (a) from about 2 percent to about 50 percent of a water-soluble alkali metal silicate glass having a $SiO_2:M_2O$ mole ratio of about 2:1 to about 4:1 wherein M represents the alkali metal;
   (b) from about 0.01 percent to about 5 percent of a water soluble base having a basicity greater than that of the silicate glass;
   (c) from about 50 percent to about 98 percent water;
   (d) pigment in an amount of from about 5 percent to about 90 percent by volume of the solids in the composition; and
   (e) a water-soluble latent insolubilizing agent;
wherein the base is ground with the pigment and insolubilizing agent first and thereafter combined with the silicate glass.

12. The method of claims 10 or 11 wherein the amount of base ranges from about 0.1 percent to about 4 percent.

13. The method of claims 10 or 11 wherein the amount of base ranges from about 0.01 percent to about 4 percent.

14. The method of claims 10 or 11 wherein the base is an alkali metal or quaternary ammonium hydroxide, an alkali metal silicate having an $SiO_2:M_2O$ mole ratio of from about 1:2 to about 2:1 where M is alkali metal, an organosilanolate, or mixture thereof.

15. The method of claims 10 or 11 wherein the base is sodium or potassium hydroxide.

16. The method of claim 11 wherein the amount of water-soluble latent insolubilizing agent is sufficient to enhance wet-abrasion resistance of a cured coating, but insufficient to cause an irreversible gel when the composition is aged for 24 hours at 70° C.

17. The method of claim 16 wherein the latent insolubilizing agent is a metallate and ranges from about 0.1 percent to about 6 percent by weight based on the combined weight of the silicate glass and insolubilizing agent.

18. The method of claim 17 wherein the latent insolubilizing agent is an alkali metal or quaternary ammonium zincate, aluminate or borate or a mixture thereof.

19. The method of claim 16 wherein the latent insolubilizing agent is formed from $Al^{+++}$, $Fe^{+++}$, $Cr^{+++}$ or $Sn^{++}$ ions and ligands selected from the group consisting of ethylenediaminetetraacetate, diethylenetriaminepentaacetate, N-(hydroxyethyl)-ethylenediaminetriacetate, nitrilotriacetate and 1,3-propanediaminetetraacetate and is present at a level ranging from about 0.2 percent to about 12 percent based on the combined weight of the silicate glass and insolubilizing agent.

20. The method of claim 17 wherein the insolubilizing agent is an alkali metal or quaternary ammonium aluminate.

21. The method of claim 20 wherein the insolubilizing agent is sodium aluminate.

22. A curable coating composition having improved pigment dispersion, consisting essentially of:
   (a) an aqueous phase of
      (i) from about 2 percent to about 50 percent of a water-soluble alkali metal silicate glass having a $SiO_2:M_2O$ mole ratio of about 2:1 to about 4:1 wherein M represents the alkali metal;
      (ii) from about 0.01 percent to about 5 percent of a water-soluble base having a basicity greater than that of the silicate glass; and
      (iii) from about 50 percent to about 98 percent of water;
   (b) pigment, wherein the pigment represents from about 5 percent to about 90 percent by volume of the solids in the composition; and
   (c) a water-soluble latent insolubilizing agent for the silicate wherein the insolubilizing agent is a metallate and is in an amount sufficient to enhance the wet-abrasion resistance of a cured coating, but insufficient to cause an irreversible gel when the composition is aged for 24 hours at 70° C.

23. The composition of claim 22 wherein the latent insolubilizing agent is an alkali metal or quaternary ammonium zincate, aluminate or borate or a mixture thereof.

24. The composition of claim 22 wherein the metallate is in an amount ranging from about 0.1 percent to about 6 percent by weight based on the combined weight of the silicate glass and insolubilizing agent.

25. The composition of claim 24 wherein the insolubilizing agent is an alkali metal or quaternary ammonium aluminate.

26. The composition of claim 25 wherein the insolubilizing agent is sodium aluminate.

* * * * *